United States Patent
Chen et al.

(10) Patent No.: US 9,228,071 B2
(45) Date of Patent: Jan. 5, 2016

(54) BLOWING AGENT COMPOSITION OF HYDROCHLOROFLUOROOLEFIN AND HYDROFLUOROOLEFIN

(71) Applicant: Arkema Inc., King of Prussia, PA (US)

(72) Inventors: Benjamin Bin Chen, Wayne, PA (US); Joseph S. Costa, Gilbertsville, PA (US); Philippe Bonnet, Lyons (FR); Maher Y. Elsheikh, Wayne, PA (US); Brett L. Van Horn, King of Prussia, PA (US)

(73) Assignee: Arkema Inc., King of Prussia, PA (US)

( * ) Notice: Subject to any disclaimer, the term of this patent is extended or adjusted under 35 U.S.C. 154(b) by 0 days.

(21) Appl. No.: 14/305,287

(22) Filed: Jun. 16, 2014

(65) Prior Publication Data

US 2014/0296360 A1 Oct. 2, 2014

Related U.S. Application Data

(63) Continuation of application No. 12/532,189, filed as application No. PCT/US2008/058602 on Mar. 28, 2008, now abandoned.

(60) Provisional application No. 60/908,751, filed on Mar. 29, 2007.

(51) Int. Cl.
*C08J 9/14* (2006.01)
*C08J 9/00* (2006.01)
*C08G 18/06* (2006.01)

(52) U.S. Cl.
CPC ............... *C08J 9/146* (2013.01); *C08G 18/06* (2013.01); *C08J 9/144* (2013.01); *C08J 9/149* (2013.01); *C08J 2203/142* (2013.01); *C08J 2203/162* (2013.01); *C08J 2203/182* (2013.01); *C08J 2300/106* (2013.01)

(58) Field of Classification Search
USPC .............................. 521/98, 131; 252/182.15
See application file for complete search history.

(56) References Cited

U.S. PATENT DOCUMENTS

| | | | |
|---|---|---|---|
| 2004/0256594 A1* | 12/2004 | Singh et al. | 252/71 |
| 2006/0142173 A1 | 6/2006 | Johnson et al. | |
| 2006/0243945 A1 | 11/2006 | Minor et al. | |
| 2007/0010592 A1 | 1/2007 | Bowman et al. | |

FOREIGN PATENT DOCUMENTS

| | | | |
|---|---|---|---|
| WO | WO 2007/002625 A2 | 1/2007 | |
| WO | WO 2007/002703 A2 | 1/2007 | |

* cited by examiner

*Primary Examiner* — Kara Boyle
(74) *Attorney, Agent, or Firm* — Steven D. Boyd

(57) ABSTRACT

A blowing agent for thermosetting foams is disclosed. The blowing agent is a hydrofluoroolefin (HCFO), preferably HFCO-1234ze in combination with a hydrochlorofluoroolefin (HCFO) preferably one selected from HCFO-1233zd, HCFO-1223, HCFO-1233xf and mixtures thereof. The blowing agent is effective as a blowing agent in the manufacture of thermosetting foams.

6 Claims, No Drawings

BLOWING AGENT COMPOSITION OF HYDROCHLOROFLUOROOLEFIN AND HYDROFLUOROOLEFIN

This application is a continuation of U.S. application Ser. No. 12/532,189 filed Sep. 21, 2009, which is the United States national phase of and claims priority to International Application serial number PCT/US08/58602 filed Mar. 28, 2008 which designated the United States, which claims priority to U.S. provisional application Ser. No. 60/908,751, filed Mar. 29, 2007, all of which are incorporated herein by references.

FIELD OF THE INVENTION

The present invention relates to blowing agents for thermosetting foams. More particularly, the present invention relates to the use of at least one hydrofluoroolefin such as HFO-1234ze in combination with at least one hydrochlorofluoroolefin (HCFO) such as HCFO-1223, HCFO-1233zd, HCFO-1233xf and mixtures thereof as a blowing agent in the manufacture of thermosetting foams.

BACKGROUND OF THE INVENTION

The Montreal Protocol for the protection of the ozone layer, signed in October 1987, mandated the phase out of the use of chlorofluorocarbons (CFCs). Materials more "friendly" to the ozone layer, such as hydrofluorocarbons (HFCs) eg HFC-134a replaced chlorofluorocarbons. The latter compounds have proven to be green house gases, causing global warming and were regulated by the Kyoto Protocol on Climate Change, signed in 1998. The emerging replacement materials, hydrofluoropropenes, were shown to be environmentally acceptable i.e. has zero ozone depletion potential (ODP) and acceptable low global warming potential (GWP).

Currently used blowing agents for thermoset foams include HFC-134a, HFC-245fa, HFC-365mfc that have relatively high global warming potential, and hydrocarbons such as pentane isomers flammable and have low energy efficiency. Therefore, new alternative blowing agents are being sought. Halogenated hydroolefinic materials such as hydrofluoropropenes and/or hydrochlorofluoropropenes have generated interest as replacements for HFCs. The inherent chemical instability of these materials in the lower atmosphere provides the low global warning potential and zero or near zero ozone depletion properties desired.

The object of the present invention is to provide novel compositions that can serve as blowing agents for thermosetting foams that provide unique characteristics to meet the demands of low or zero ozone depletion potential, lower global warming potential and exhibit low toxicity.

SUMMARY OF THE INVENTION

The present invention relates to the use of blowing agents with negligible (low or zero) ozone-depletion and low global warming potential based upon unsaturated halogenated hydroolefins. The blowing agents comprise at least one hydrofluoroolefin preferably (HFO) HFO-1234ze in a combination with at least one hydrochlorofluoroolefin (HCFO) such as HCFO-1223, HCFO-1233zd, HCFO-1233xf and mixtures thereof. HFO-1234ze is 1,3,3,3-tetrafluoropropene; HCFO 1223 dichlorotrifluoropropene; HCFO-1233zd is 1-chloro-3,3,3-trifluoropropene; HCFO1233xf is 2-chloro-3, 3,3-trifluoropropene. The composition can further comprises an additional hydrofluoroolefins (HFO), a hydrofluorocarbon, a hydrocarbon, an alcohol, an aldehyde, a ketone ether/diether, an ester, carbon dioxide and mixtures thereof.

Hydrofluoroolefin (HFO) materials have been proposed as blowing agents which exhibit a low global warming potential and a low ozone depletion value. The low global warming potential and a low ozone depletion value are a result of the atmospheric degradation of the hydrofluoroolefins.

The hydrofluoroolefin, preferably HFO-1234ze in combination with a hydrochlorofluoroolefin (HCFO) preferably selected from HCFO-1223, 1233zd, HCFO-1233xf and mixtures thereof combination can be used as a foaming agent for thermosetting foams by being mixed in a polyols mixture. The resulted products show superior quality including decreased density and improved k-factor. The foaming agent dissolves in thermosetting polymers, and provides a degree of plasticization sufficient to produce acceptable foams.

The preferred blowing agent composition, hydrofluoroolefin, preferably HFO-1234ze in combination with a hydrochlorofluoroolefin (HCFO) preferably selected from HCFO-1223, HCFO-1233zd, HCFO-1233xf and mixtures thereof of the present invention exhibits good solubility in polyol mixture used in producing polyurethane and polyisocyanurate foams. All references herein to HFO-1234ze include the cis isomer, the trans isomers and mixtures thereof. A major portion of the composition of the present invention is the hydrofluoroolefin, preferably HFO-1234ze component. A preferred ratio of the hydrofluoroolefin, preferably HFO-1234ze component in combination with a hydrochlorofluoroolefin (HCFO) preferably selected from HCFO-1223, HCFO-1233zd, HCFO-1233xf and mixtures thereof is more than about 5 wt % hydrofluoroolefin, preferably HFO-1234ze.

The hydrofluoroolefin, preferably HFO-1234ze in combination with a hydrochlorofluoroolefin (HCFO) preferably selected from HCFO-1223, HCFO-1233zd, HCFO-1233xf and mixtures thereof composition of the present invention may be used in combination with low or zero ozone depletion value materials including but not limited to: (a) hydrofluorocarbons including but not limited to difluoromethane (HFC32); 1,1,1-trifluoroethane (143a); 1,1,1,2,2-pentafluoroethane (HFC125); 1,1,2,2-tetrafluoroethane (HFC134); 1,1,1,2-tetrafluoroethane (HFC134a); 1,1-difluoroethane (HFC152a); 1,1,1,2,3,3,3-heptafluoropropane (HFC227ea); 1,1,1,3,3-pentafluoropropane (HFC245fa); 1,1,1,3,3-pentafluorobutane (HFC365mfc) and 1,1,1,2,2,3,4,5,5,5-decafluoropentane (HFC4310mee). (b) additional hydrofluoroolefins, other than HFO-1234ze, including but not limited to tetrafluoropropenes such as HFO1234yf; trifluoropropenes such as HFO1243zf; all tetrafluorobutene isomers (HFO1354); all pentafluorobutene isomers (HFO1345); all hexafluorobutene isomers (HFO1336); all heptafluorobutene isomers (HFO1327); all heptafluoropentene isomers (HFO1447); all octafluoropentene isomers (HFO1438) and all nonafluoropentene (HFO1429) (c) hydrocarbons including but not limited to, pentane isomers, butane isomers, (d) C1 to C5 alcohols, C1 to C4 aldehydes, C1 to C4 ketones, C1 to C4 esters, C1 to C4 ethers and diethers and carbon dioxide The foamable compositions of the present invention generally includes one or more components capable of forming foam having a generally cellular structure and a blowing agent, typically in a combination, in accordance with the present invention. In certain embodiments, the one or more components comprise a thermosetting composition capable of forming foam and/or foamable compositions. Examples of thermosetting compositions include polyurethane and polyisocyanurate foam compositions, and also phenolic foam compositions. In such thermosetting foam embodiments, one or more of the present compositions are included as or part of a blowing agent in a foamable composition, or as a part of a two or more part foamable composition, which preferably includes one or more of the components capable of reacting and/or foaming under the proper conditions to form a foam or cellular structure.

The invention also relates to foam, and preferably closed cell foam, prepared from a polymer foam formulation containing a blowing agent comprising the compositions of the invention. In yet other embodiments, the invention provides foamable compositions comprising thermosetting foams, such as polyurethane and polyisocyanurate foams, preferably low-density foams, flexible or rigid.

It will be appreciated by those skilled in the art that the order and manner in which the blowing agent combination of the present invention is formed and/or added to the foamable composition does not generally affect the operability of the present invention. For example, in the case of polyurethane foams, it is possible that the various components of the blowing agent combination, and even the components of the present composition, not be mixed in advance of introduction to the foaming equipment, or even that the components are not added to the same location in the foaming equipment. Thus, in certain embodiments it may be desired to introduce one or more components of the blowing agent combination in a blender with the expectation that the components will come together in the foaming equipment and/or operate more effectively in this manner. Nevertheless, in certain embodiments, two or more components of the blowing agent combination are combined in advance and introduced together into the foamable composition, either directly or as part of premix that is then further added to other parts of the foamable composition.

EXAMPLES

Example 1

Foam Preparation

The foam was made by a small polyurethane dispenser. The dispenser consists of two pressurized cylinders, and pressure can be adjusted by regulators. B-side (polyols) mixtures were pre-blended and then charged into pressurized cylinders, and A-side consists of MDI. Blowing agents were then added into B-side cylinder and mixed thoroughly. The cylinders were connected to dispensing gun equipped with a static mixer. The pressures of both cylinders were adjusted so that desired ratio of A and B sides can be achieved. The formulations tested (all had an Iso Index ROH of 110) each contained Rubinate M, a polymeric methylene diphenyl diisocyanate (MDI) available from Huntsman; Jeffol SG-360 and R-425-X, polyols from Huntsman; TEAP-265, a polyol from Carpenter Company. TegostabB 8465 a surfactant available from Evonik-Degussa. Jeffcat TD33A and ZR-70 are catalysts from Huntsman. NP 9.5, a compatibilizer from Huntsman. Total blowing level is 26.0 ms/g.

TABLE 1

Formulation for HFO1234ze and HCFO1233zd (trans)

| | Formulation (wt %) | | | | |
|---|---|---|---|---|---|
| | A | B | C | D | E |
| Jeffol SG-360 | 14.93 | 15.07 | 14.80 | 14.77 | 15.35 |
| Jeffol R-425-X | 4.27 | 4.31 | 4.23 | 4.22 | 4.39 |
| TEAP-265 | 8.53 | 8.61 | 8.45 | 8.44 | 8.77 |
| DEG | 2.13 | 2.15 | 2.11 | 2.11 | 2.19 |
| Jeffcat TD33A | 0.23 | 0.23 | 0.23 | 0.23 | 0.23 |
| Jeffcat ZR70 | 0.23 | 0.23 | 0.23 | 0.23 | 0.23 |
| Tegostab B8465 | 0.89 | 0.90 | 0.90 | 0.90 | 0.90 |
| NP 9.5 | 6.50 | 6.50 | 6.50 | 6.50 | 6.50 |
| Water | 0.42 | 0.42 | 0.42 | 0.42 | 0.42 |
| HFO1234ze | 11.56 | 9.65 | 1.21 | 0 | 0 |
| HCFO1233zd | 0 | 1.08 | 10.74 | 12.11 | 0 |
| HFC 134a | 0 | 0 | 0 | 0 | 9.47 |
| Rubinate M | 50.4 | 50.9 | 50.2 | 50.1 | 51.6 |
| A side/B side | 1.02 | 1.04 | 1.01 | 1.00 | 1.06 |

Table 1 Summarizes the formulation for each run. HFC134a was used as reference blowing agent.

Example 2

B-Side Vapor Pressure

TABLE 2

HFO1234ze Vapor Pressure in B-side mixtures

| | A | B | C | D |
|---|---|---|---|---|
| B-side Vapor Pressure (psig) | 44.0 | 39.0 | 0 | 0 |
| HFO 1234ze (wt %) | 23.3 | 19.6 | 2.4 | 0 |
| HCFO 1233zd (wt %) | 0 | 2.2 | 21.6 | 24.3 |
| Pressure/concentration* | 189 | 199 | 0 | 0 |

*B-side vapor pressure/HFO1234ze concentration

The results as shown in Table 2 illustrate that use of HCFO 1233zd can reduce the vapor pressure of b-side mixture. The lower the vapor pressure, the better solubility of a blowing agent. From test A to C, as HFO1234ze concentration decreases, the pressure decreases, however, for sample C, the vapor pressure was zero psig, this is an unexpected result.

Example 3

K-Factor

As shown in Table 3, the k-factor measurements (ASTM C518) on the resulting foams were conducted at between 10 and 130° F. k-factors are taken within 48 hours after removing foam skin with a band saw. Lower k-factors indicate better insulation values.

TABLE 3

Comparison of k-factors

| Temperature (° F.) | A | B | C | D | E |
|---|---|---|---|---|---|
| | \multicolumn{5}{c}{K factor (Btu · in./ft$^2$ · h · ° F.)} | | | | |
| 17.6 | 0.1337 | 0.1225 | 0.1252 | 0.1222 | 0.1289 |
| 32.0 | 0.1373 | 0.1285 | 0.1285 | 0.1250 | 0.1343 |
| 50.0 | 0.1430 | 0.1381 | 0.1342 | 0.1302 | 0.1419 |
| 75.2 | 0.1542 | 0.1500 | 0.1458 | 0.1416 | 0.1536 |
| 104.0 | 0.1677 | 0.1636 | 0.1592 | 0.1549 | 0.1670 |

K-factor is a key parameter for thermal insulation. Addition of HCFO1233zd to HFO1234ze improved the k-factor of foam made of HFO 1234ze alone.

Examples 4

Foam Volume Changes

TABLE 4

Comparison of foam volume change

| Sample | Volume Change (%) |
|---|---|
| A | −3.4 |
| B | +5.0 |
| C | +24.3 |
| D | +21.3 |
| E | −15.0 |

Thermal and humid aging test was done according to ASTM D2126. The foam was kept in the oven for 7 days at 70° C. and 97% relative humidity. The results were summarized in Table 4. It should be pointed out that the formula was not optimized for dimensional stability, but for study of degree of plasticization. It is known to people skilled in the art that HFC134a has poor solubility in polyol mixtures and polymers, indicating it has a relatively low degree of plasticization in polyurethane. In sample E, the foam had a 15% volume reduction, suggesting that cells burst. The polymer had a lower elasticity as a result of the low degree of plasticization. However as shown in sample D that only HCFO1233zd was used, volume actually increased, it is opposite to sample E. Sample A contained HFO1234ze only, and the result shown a reduction of volume, indicating some cells bursted. Sample C contained both HCFO1233zd and HFO134ze; the volume increased even more that sample D. These results are unexpected.

Example 5

Processibility

TABLE 5

Free rise density

| Sample | Free Rise Density (pcf) |
|---|---|
| A | 1.78 |
| B | 1.80 |
| C | 1.64 |
| D | 1.71 |
| E | 2.01 |

As shown in Table 5, sample C has the lowest free rise density in the study, suggesting a synergistic effect between HFO1233zd and HFO 1234ze. A low free rise density results in lower fill weight and material saving.

TABLE 6

Degree of frothing

| Sample | Degree of frothing |
|---|---|
| A | High |
| B | High |
| C | None |
| D | None |
| E | Very high |

Table 5 shown the degree of frothing is getting less as the level of HCFO1233zd increase. The degree of frothing is a process parameter that should be controlled. The less the degree of frothing, the easier the foam precursor flows, the better the foam quality, and the better the insulation properties.

Although the invention is illustrated and described herein with reference to specific embodiments, it is not intended that the appended claims be limited to the details shown. Rather, it is expected that various modifications may be made in these details by those skilled in the art, which modifications may still be within the spirit and scope of the claimed subject matter and it is intended that these claims be construed accordingly.

The invention claimed is:

1. A foam product comprising:
   a thermosetting foam material selected from the group consisting of polyurethane and polyisocyanurate; and
   a blowing agent comprising the hydrochlorofluoroolefin 1-chloro-3,3,3-trifluoropropene and a first hydrofluoroolefin 1,3,3,3-tetrafluoropropene wherein the mole ratio of 1-chloro-3,3,3-trifluoropropene to 1,3,3,3-tetrafluoropropene ranges from 30:70 to 10:90.

2. The foam product of claim 1, further comprising a coblowing agent selected from non-hydrofluoroolefin and non-hydrochlorofluoroolefin hydrofluorocarbons.

3. The foam product of claim 2 wherein said hydrofluorocarbon is selected from the group consisting of difluoromethane (HFC32); 1,1,1,2,2-pentafluoroethane (HFC125); 1,1,1-trifluoroethane (143a); 1,1,2,2-tetrafluoroethane (HFC 134); 1,1,1,2-tetrafluoroethane (HFC134a); 1,1-difluoroethane (HFC152a); 1,1,1,2,3,3,3-heptafluoropropane (HFC227ea); 1,1,1,3,3-pentafluoropropane (HFC245fa); 1,1,1,3,3-pentafluorobutane (HFC365mfc) and 1,1,1,2,2,3,4,5,5,5-decafluoropentane (HFC4310mee).

4. The foam product of claim 3, further comprising a second hydrofluoroolefin selected from the group consisting of tetrafluoropropenes; trifluoropropenes; tetrafluorobutene isomers; pentafluorobutene isomers; hexafluorobutene isomers; heptafluorobutene isomers; heptafluoropentene isomers; octafluoropentene isomers and nonafluoropentene isomers.

5. The foam product of claim 2 further comprising a component selected from the group consisting of a second hydrofluoroolefin (HFO), a hydrofluorocarbon, a hydrocarbon, an alcohol, an aldehyde, a ketone, an ether/diether, an ester, carbon dioxide and mixtures thereof.

6. The foam product of claim 2, further comprising a second hydrofluoroolefin selected from the group consisting of HFO-1234yf, HFO-1243zf, HFO-1354, HFO-1345, HFO-1336, HFO-1327, HFO-1447, HFO-1438, and HFO-1429.

* * * * *